US 10,795,672 B2

(12) United States Patent
Dwars et al.

(10) Patent No.: US 10,795,672 B2
(45) Date of Patent: Oct. 6, 2020

(54) AUTOMATIC GENERATION OF MULTI-SOURCE BREADTH-FIRST SEARCH FROM HIGH-LEVEL GRAPH LANGUAGE FOR DISTRIBUTED GRAPH PROCESSING SYSTEMS

(71) Applicant: Oracle International Corporation, Redwood Shores, CA (US)

(72) Inventors: Martijn Dwars, San Francisco, CA (US); Martin Sevenich, Palo Alto, CA (US); Sungpack Hong, Palo Alto, CA (US); Hassan Chafi, San Mateo, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 141 days.

(21) Appl. No.: 16/176,853

(22) Filed: Oct. 31, 2018

(65) Prior Publication Data

US 2020/0133663 A1 Apr. 30, 2020

(51) Int. Cl.
  *G06F 8/75* (2018.01)
  *G06F 8/51* (2018.01)
  (Continued)

(52) U.S. Cl.
  CPC .......... *G06F 8/75* (2013.01); *G06F 8/31* (2013.01); *G06F 8/452* (2013.01); *G06F 8/51* (2013.01); *G06F 16/9024* (2019.01)

(58) Field of Classification Search
  CPC ... G06F 8/31; G06F 8/452; G06F 8/51; G06F 8/75; G06F 16/9024; G06F 8/40; G06F 8/45; G06F 8/451
  (Continued)

(56) References Cited

U.S. PATENT DOCUMENTS 6,883,161 B1 4/2005 Chovin et al.
7,366,842 B1 4/2008 Accoclla
(Continued)

OTHER PUBLICATIONS

O. G. Attia, T. Johnson, K. Townsend, P. Jones and J. Zambreno, "CyGraph: A Reconfigurable Architecture for Parallel Breadth-First Search," 2014 IEEE International Parallel & Distributed Processing Symposium Workshops, Phoenix, AZ, 2014, pp. 228-235, doi: 10.1109/IPDPSW.2014.30. (Year: 2014).*
(Continued)

*Primary Examiner* — Andrew M. Lyons
(74) *Attorney, Agent, or Firm* — Hickman Palermo Becker Bingham LLP

(57) ABSTRACT

Techniques are described herein for automatic generation of multi-source breadth-first search (MS-BFS) from high-level graph processing language that can be executed in a distributed computing environment. In an embodiment, a method involves a computer analyzing original software instructions. The original software instructions are configured to perform multiple breadth-first searches to determine a particular result. Each breadth-first search originates at each of a subset of vertices of a graph. Each breadth-first search is encoded for independent execution. Based on the analyzing, the computer generates transformed software instructions configured to perform a MS-BFS to determine the particular result. Each of the subset of vertices is a source of the MS-BFS. In an embodiment, the second plurality of software instructions comprises a node iteration loop and a neighbor iteration loop, and the plurality of vertices of the distributed graph comprise active vertices and neighbor vertices. The node iteration loop is configured to iterate once per each active vertex of the plurality of vertices of the distributed graph, and the node iteration loop is configured to determine the particular result. The neighbor iteration loop is configured to iterate once per each active vertex of
(Continued)

the plurality of vertices of the distributed graph, and each iteration of the neighbor iteration loop is configured to activate one or more neighbor vertices of the plurality of vertices for the following iteration of the neighbor iteration loop.

20 Claims, 4 Drawing Sheets

(51) Int. Cl.
*G06F 8/41* (2018.01)
*G06F 8/30* (2018.01)
*G06F 16/901* (2019.01)

(58) Field of Classification Search
USPC .............. 717/120, 136–137, 140, 144–146, 717/149–150
See application file for complete search history.

(56) References Cited

U.S. PATENT DOCUMENTS

| | | |
|---|---|---|
| 7,478,375 B1 | 1/2009 | Kersters |
| 8,046,751 B1* | 10/2011 | Avadhanula ............. G06F 8/75 717/104 |
| 8,826,255 B1* | 9/2014 | Avadhanula ............ G06F 8/433 717/154 |
| 8,910,134 B2 | 12/2014 | Hong et al. |
| 8,949,811 B2 | 2/2015 | Murthy |
| 10,409,560 B1* | 9/2019 | Bebee ..................... G06F 8/311 |
| 2004/0194074 A1 | 9/2004 | Shibayama |
| 2005/0278451 A1 | 12/2005 | Yamashita |
| 2006/0195463 A1 | 8/2006 | Bogner |
| 2011/0055511 A1 | 3/2011 | Mantor |
| 2011/0087670 A1* | 4/2011 | Jorstad ................. G06F 40/284 707/741 |
| 2011/0099541 A1 | 4/2011 | Blomstedt |
| 2011/0138369 A1 | 6/2011 | Chandra |
| 2011/0276962 A1 | 11/2011 | Chambers |
| 2013/0086354 A1 | 4/2013 | Satish |
| 2013/0097136 A1 | 4/2013 | Goldberg |
| 2013/0139135 A1 | 5/2013 | Ditu |
| 2013/0297605 A1* | 11/2013 | Cohen ..................... G06F 16/35 707/737 |
| 2013/0339352 A1* | 12/2013 | Jin ........................ G06Q 10/047 707/736 |
| 2014/0019949 A1 | 1/2014 | Craymer |
| 2014/0122812 A1 | 5/2014 | Hakura |
| 2014/0137130 A1 | 5/2014 | Jacob |
| 2014/0172810 A1* | 6/2014 | Paradies ............. G06F 16/9024 707/705 |
| 2014/0189665 A1 | 7/2014 | Hong et al. |
| 2014/0244687 A1 | 8/2014 | Shmueli |
| 2014/0282574 A1* | 9/2014 | Marathe ................ G06F 9/4881 718/103 |
| 2014/0306964 A1 | 10/2014 | Reddish |
| 2014/0310619 A1 | 10/2014 | Fickenwirth |
| 2014/0351820 A1 | 11/2014 | Lee |
| 2015/0007154 A1 | 1/2015 | Bharadwaj |
| 2015/0040110 A1 | 2/2015 | Adl-Tabatabai |
| 2015/0089485 A1* | 3/2015 | Baskaran .............. G06F 9/4881 717/160 |
| 2015/0095698 A1 | 4/2015 | Ema |
| 2015/0128151 A1 | 5/2015 | Rak |
| 2015/0178405 A1 | 6/2015 | Hong et al. |
| 2015/0331683 A1 | 11/2015 | Sevenich et al. |
| 2015/0350324 A1 | 12/2015 | Hu et al. |
| 2015/0355891 A1 | 12/2015 | Angerer |
| 2015/0370838 A1* | 12/2015 | Paradies ............. G06F 16/9024 707/738 |
| 2016/0019228 A1 | 1/2016 | Hong |
| 2016/0048607 A1 | 2/2016 | Raman |
| 2016/0062776 A1 | 3/2016 | Stanfill |
| 2016/0117358 A1 | 4/2016 | Schmid |
| 2016/0335322 A1 | 11/2016 | Then et al. |
| 2016/0364220 A1 | 12/2016 | Arai |
| 2017/0024192 A1 | 1/2017 | Hong et al. |
| 2017/0060958 A1* | 3/2017 | Van Rest ............ G06F 16/9024 |
| 2017/0168779 A1 | 6/2017 | Sevenich |
| 2018/0203897 A1* | 7/2018 | Van Rest ............ G06F 16/9024 |
| 2018/0307777 A1* | 10/2018 | Sevenich ................ G06F 16/23 |
| 2018/0329958 A1* | 11/2018 | Choudhury ........... G06F 21/552 |
| 2019/0258401 A1* | 8/2019 | Li ......................... H03M 7/707 |
| 2020/0117762 A1* | 4/2020 | Haprian .................. G06F 17/18 |

OTHER PUBLICATIONS

S. Beamer, A. Buluç, K. Asanovic and D. Patterson, "Distributed Memory Breadth-First Search Revisited: Enabling Bottom-Up Search," 2013 IEEE International Symposium on Parallel & Distributed Processing, Workshops and Phd Forum, Cambridge, MA, 2013, pp. 1618-1627, doi: 10.1109/IPDPSW.2013.159. (Year: 2013).*
J. W. Berry, B. Hendrickson, S. Kahan and P. Konecny, "Software and Algorithms for Graph Queries on Multithreaded Architectures," 2007 IEEE International Parallel and Distributed Processing Symposium, Rome, 2007, pp. 1-14, doi: 10.1109/IPDPS.2007.370685. (Year: 2007).*
Z. Fu, H. K. Dasari, B. Bebee, M. Berzins and B. Thompson, "Parallel Breadth First Search on GPU clusters," 2014 IEEE International Conference on Big Data (Big Data), Washington, DC, 2014, pp. 110-118, doi: 10.1109/BigData.2014.7004219. (Year: 2014).*
Harshvardhan, A. Fidel, N. M. Amato and L. Rauchwerger, "KLA: A new algorithmic paradigm for parallel graph computations," 2014 23rd International Conference on Parallel Architecture and Compilation Techniques (PACT), Edmonton, AB, 2014, pp. 27-38, doi: 10.1145/2628071.2628091. (Year: 2014).*
Z. Shang and J. X. Yu, "Catch the Wind: Graph workload balancing on cloud," 2013 IEEE 29th International Conference on Data Engineering (ICDE), Brisbane, QLD, 2013, pp. 553-564, doi: 10.1109/ICDE.2013.6544855. (Year: 2013).*
A. Yoo, E. Chow, K. Henderson, W. McLendon, B. Hendrickson and U. Catalyurek, "A Scalable Distributed Parallel Breadth-First Search Algorithm on BlueGene/L," SC '05: Proceedings of the 2005 ACM/IEEE Conference on Supercomputing, Seattle, WA, USA, 2005, pp. 25-25, doi: 10.1109/SC.2005.4. (Year: 2005).*
Then, U.S. Appl. No. 14/710,117, filed May 12, 2018, Notice of Allowance, dated Aug. 23, 2018.
Then, U.S. Appl. No. 14/710,117, filed May 12, 2018, Final Office Action, dated May 16, 2018.
Then, U.S. Appl. No. 14/710,117, filed May 12, 2015, Interview Summary, dated Jul. 18, 2018.
Then U.S. Appl. No. 14/710,117, filed May 15, 2015, Office Action, dated Oct. 11, 2017.
Lopez, Karen, "Your Master Data Is a Graph: Are You Ready?", Oracle, dated Mar. 2015, 14 pages.
Bak et al., "A Reference Interpreter for the Graph Programming Language GP 2", Proc. Graphs as Models (GaM 2015), vol. 181, dated Apr. 2015, 17 pages.
Banerjee et al., "Towards Logical Level Design of Big Data", dated Jul. 2015, 7 pages.
Hang et al., "iBFS: Concurrent Breadth-First Search on GPUs", SIGMOD, dated Jun. 26, 2016, ACM, 14 pages.
Hong et al. "Green-Marl: A DSL for Easy and Efficeient Graph Analysis", ASPLOS' dated Mar. 2012, 14 pages.
Hong et al., "Early Experiences in Using a Domain-Specific Language for Large-Scale Graph Analysis", ACM, Grades, dated 2013, pp. 1-6.
Ariful et al., "A Parallel Tree Grafting Algorithm for Maximum Cardinality Matching in Bipartite Graphs", dated May 25, 2015, 10 pages.
Liu et al., "iBFS: Concurrent Breadth-First Search on GPUs", SIGMOD'16, Jun. 26-Jul. 1, 2016, San Francisco, CA, USA, 14 pages.
Yuechao, et al., "Multi-GPU Graph Analytics", dated Apr. 19, 2015, 12 pages.

(56) References Cited

OTHER PUBLICATIONS

Madduri, Kamesh, "Scaling up graph algorithms on emerging multicore systems", Berkeley Lab, 22 pages.
Perez et al., "Ringo: Interactive Graph Analytics on Big-Memory Machines", ACM, SIGMOD, dated May 2015, 6 pages.
Schiller et al., "Efficient Data Structures for Dynamic Graph Analysis", IEEE, dated Nov. 2015, pp. 497-504.
Sevenich et al., "Using Domain-Specific Languages for Analytic Grpah Database", VLDB Endowment, dated Sep. 2016, pp. 1257-1268.
Then et al., "The More the Merrier: Efficient Multi-Source Graph Traversal", Proceedings of the VLDB Endowment, vol. 8 Issue 4, Dec. 2014, 12 pages.
Yanagisawa, "A Multi-Source Label-Correcting Algorithm for the All Pairs Shorest Paths Problem", dated 2010, IEEE, pp. 1-10.
Hong et al., "Simplifying Scalable Graph Processing with a Domain-Specific Language", ADM, CGO'14, pp. 208-218.

\* cited by examiner

FIG. 2

PROCESS 200

Analyze a first plurality of software instructions, wherein the first plurality of software instructions is configured to perform a plurality of breadth-first searches to determine a particular result, wherein each breadth-first search originates at each of a plurality of vertices of a distributed graph, wherein each breadth-first search is encoded for independent execution
202

Based on the analyzing, generate a second plurality of software instructions configured to perform a multi-source breadth-first search to determine the particular result, wherein each of the plurality of vertices is a source of the multi-source breadth-first search
204

US 10,795,672 B2

AUTOMATIC GENERATION OF MULTI-SOURCE BREADTH-FIRST SEARCH FROM HIGH-LEVEL GRAPH LANGUAGE FOR DISTRIBUTED GRAPH PROCESSING SYSTEMS

FIELD OF THE INVENTION

The present invention relates to automatic analysis of a logical graph. Automatic analysis is accelerated through program transformation.

BACKGROUND

Graph analysis is a recently popularized way of analyzing data, which considers not only properties of entities but also relationships between entities. Many algorithms for graph analysis are based on breadth-first search (BFS). BFS systematically traverses a graph from a source vertex to vertices of increasing distance away. The distance may be determined by the number of traversed edges from a respective source vertex. All vertices of a given distance from the source vertex are processed before BFS expands the distance to include vertices one edge further away. BFS repeatedly expands the distance until all vertices of a graph are reached or until a termination condition occurs.

Some graph algorithms entail running multiple BFSs from different source vertices in a graph. Examples of such algorithms include closeness centrality and betweenness centrality. Existing systems solve this problem by running all necessary BFSs independently. These systems do not leverage shared computation between the BFSs. Consequently, many graph traversals are made redundantly, which costs extra time, space, and energy.

A technique, referred to herein as multi-source BFS (MS-BFS), enables fast computation of multiple BFSs by efficiently performing several simultaneous instances of BFS traversals. Hence, the MS-BFS technique provides performance benefits. A generic MS-BFS may be implemented as an encapsulated function that an application may directly invoke from user logic. User logic may specify processing to occur on each visited node or edge and what conditions terminate each search.

In order to process huge data sets that do not fit within the memory of a single computer, academia and industry use distributed graph processing systems. In these systems, graph data is partitioned over multiple computers of a cluster, and the computation is performed in a distributed manner.

However, it is challenging to apply the MS-BFS technique in graph analysis because of the complexity of the technique. Specifically, users need to combine their own code with the complicated MS-BFS traversal code, which is not straightforward—all the execution context required for user code needs to be properly managed in the traversal. For distributed systems, this task becomes even more complex as non-local memory cannot be randomly accessed and the code has to handle inter-machine communication and synchronization. Techniques are desired to automate the MS-BFS technique for distributed graph processing systems.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 2 illustrates an example procedure for compiling a search algorithm according to various embodiments.

DETAILED DESCRIPTION

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for automatic generation of multi-source breadth-first search from high-level graph processing language for distributed graph processing systems. In an embodiment, a method involves a computer analyzing original software instructions. The original software instructions are configured to perform multiple explicitly specified breadth-first searches to determine a particular result. Each breadth-first search originates at each of a subset of vertices of a distributed graph. Each breadth-first search is encoded for independent execution, perhaps as independent iterations of a for loop such that each breadth-first search instance or iteration may operate without depending on the other instances for data.

Based on analyzing the original software instructions, the computer generates transformed software instructions that are configured to perform a multi-source breadth-first search to determine the particular result. Each of the subset of vertices is a source of the multi-source breadth-first search and include active vertices and neighbor vertices.

The transformed instructions include a node iteration loop that is configured to iterate once per each active vertex of the plurality of vertices of the distributed graph and determine the particular result. The transformed instructions also include a neighbor iteration loop that is configured to iterate once per each active vertex of the plurality of vertices of the distributed graph. Each iteration of the neighbor iteration loop is configured to activate one or more neighbor vertices of the plurality of vertices for the following iteration of the neighbor iteration loop.

The neighbor iteration loop of the transformed instructions passes messages between machines that store and process partitions of a distributed graph. Thus, the transformed instructions are configured to be executed by a distributed graph processing engine. The improved transformation technique allows works for distributed systems and allows the use of multi-source breadth-first search in a way that is transparent to the user and automated for efficient generation of code that can be executed by a distributed graph processing engine.

Example Distributed Search Compiler System

Figure 1:
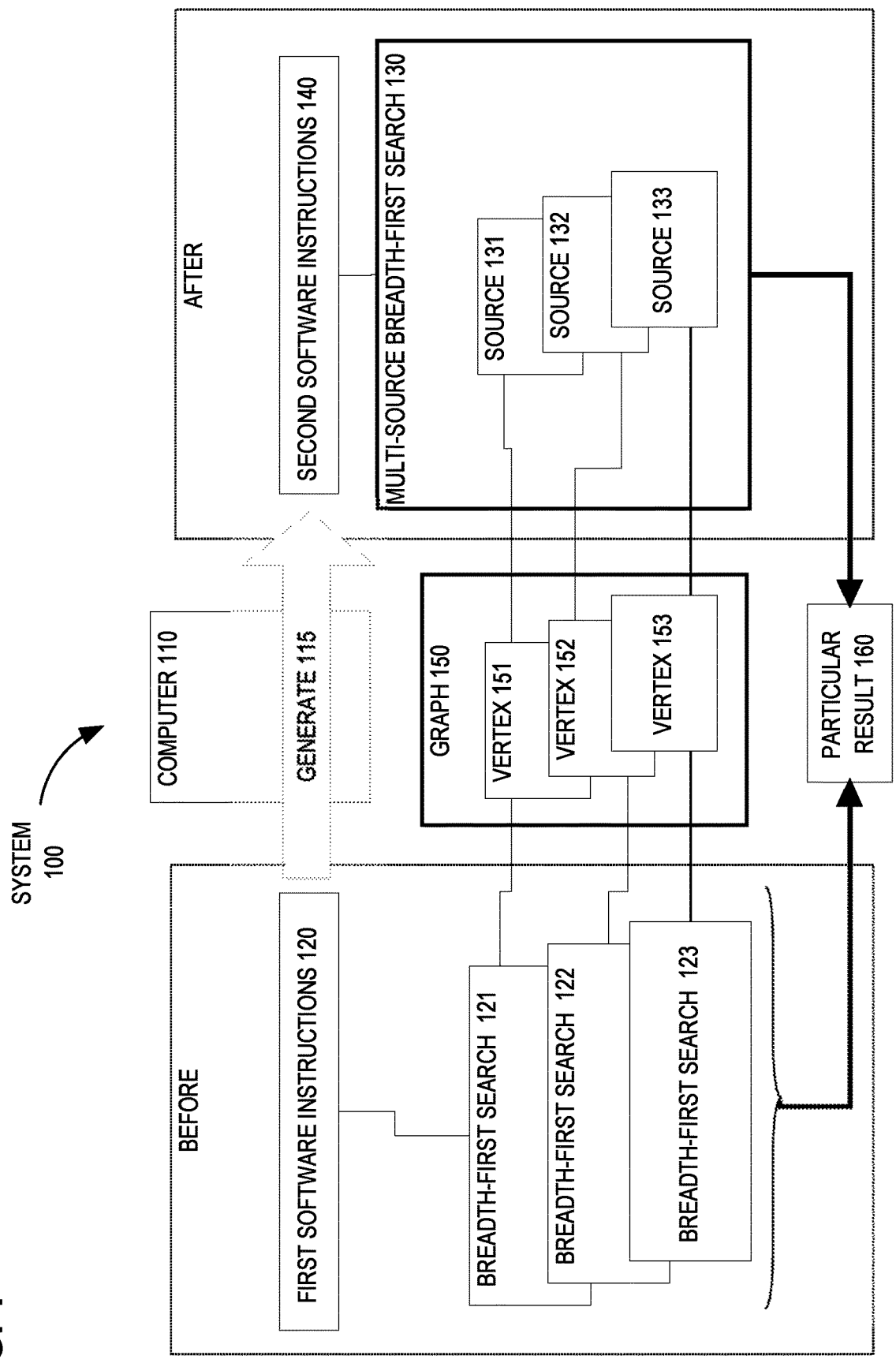
FIG. 1 is a logical block diagram illustrating an example search compiler system in which certain techniques described herein may be implemented, according to various embodiments.

FIG. 1 illustrates a block diagram of example search compiler system 100, in which techniques described herein may be practiced. Search compiler system 100 automatically generates a multi-source breadth-first search. Search compiler system 100 includes computer 110, first software instructions 120, and second software instructions 140. First software instructions 120 and second software instructions 140 comprise graph analysis logic. First software instructions 120, and perhaps second software instructions 140, are expressed as statements in a high level graph processing language. For example, first software instructions 120 may be expressed as a high-level domain-specific language (DSL) such as Green-Marl.

First software instructions 120 are configured to analyze graph 150. Graph 150 has many vertices, such as at least vertices 151-153, that are interconnected by edges. Graph 150 may be directed or undirected. Graph 150 may be cyclic or acyclic. Graph 150 may be connected or disconnected. Graph 150 may be a distributed graph where the vertices are distributed throughout the local memories of an aggregation of networked computers 110 that support distributed graph processing.

First software instructions 120 are configured to perform multiple explicitly specified breadth-first searches, such as at least breadth-first searches 121-123. Breadth-first search is an algorithm that traverses edges of a graph to visit vertices one after another. Breadth-first search starts at a source vertex. Each vertex that breadth-first search visits is visited only once. Breadth-first search may stop after visiting all vertices of a graph or sooner if a termination criterion is met, such as reaching a particular node. Breadth-first search visits vertices in order of increasing distance from the source vertex.

First software instructions 120 may be configured to perform any of a wide variety of graph analysis algorithms that involve multiple breadth-first searches. For example, first software instructions 120 may perform graph analytics according to a specific algorithm from such broad categories of algorithms as graph centrality, network flow, and all-pairs shortest paths. A legacy program that performs graph centrality as independent breadth-first searches may be difficult to re-instrument by hand to properly invoke a reusable MS-BFS function. However, search compiler system 100 may automatically accomplish such re-instrumentation.

Each of breadth-first searches 121-123 starts at a different source vertex, such as vertices 151-153 respectively. Graph 150 may have more vertices than are sources of searches. Breadth-first searches 121-123 are based on a shared logic that is part of first software instructions 120. Breadth-first searches 121-123 may be configured to proceed serially or in parallel, such as each search in a separate thread. Each vertex of graph 150 may be visited by none, one, or many of breadth-first searches 121-123. Redundant processing is a consequence of a vertex being visited by multiple searches.

Although an embodiment need not execute first software instructions 120, computer 110 performs static analysis of first software instructions 120. Computer 110 may be a personal computer, a smart phone, a rack server such as a blade, a mainframe, or an aggregation of networked computers that support distributed graph processing engine such as PGX.D, or a Beowulf cluster, perhaps configured for bulk synchronous parallelism such as MapReduce. The distributed graph processing engine is assumed to support a Bulk-Synchronous Processing (BSP) model. BSP systems are characterized by the operations they support including processors that are capable of performing local computation, a network that is capable of routing messages between processors, and the functionality to impose a barrier to synchronize all processors. Computer 110 may have special processors such as a multicore processor or a graphics processor or other vector processor.

During analysis, computer 110 scans first software instructions 120 for explicitly specified breadth-first searches that are based on a shared logic, such as breadth-first searches 121-123. Computer 110 combines breadth-first searches 121-123 into multi-source breadth-first search 130. A multi-source breadth-first search is an optimized combination of multiple equivalent breadth-first searches that each originates from a different source node. Equivalent here means that for each source node a same code is executed, such as the inner logic discussed for FIG. 3. Note that the control flow may differ between source nodes, as discussed for FIG. 5.

A multi-source breadth-first search optimizes by avoiding redundant processing that is a consequence of a vertex being visited by multiple searches. Optimization may reduce demand for time or space. Optimization relies on sharing or reusing the results of computations that occur during traversals of subgraphs that are common to more than one individual breadth-first search. Such sharing may be achieved with, perhaps distributed, shared memory or another data sharing mechanism.

Multi-source breadth-first search 130 may specify sequential, parallel processing, and/or distributed processing. Task parallelism is well suited for multi-source breadth-first search 130. Task parallelism may be fine grained, with a separate thread for each source vertex or each neighbor vertex at a same level of a search. Task parallelism may be coarse grained, with some or all vertices sharing a thread. Multi-source breadth-first search 130 need not agree with breadth-first searches 121-123 as to whether parallel, sequential processing, and/or distributed processing is used. Although both multi-source breadth-first search 130 and breadth-first searches 121-123 may be parallel, multi-source breadth-first search 130 need not have a same granularity of parallelism as breadth-first searches 121-123.

Computer 110 derives multi-source breadth-first search 130 based on the shared logic of breadth-first searches 121-123. The source vertices of multi-source breadth-first search 130 are the same as the source vertices of breadth-first searches 121-123. During generate 115, computer 110 generates second software instructions 140 based on the analysis of first software instructions 120. Second software instructions 140 are configured to perform multi-source breadth-first search 130. Second software instructions 140 may be configured for dynamic parallelism. Second software instructions 140 may also be configured to be executed on a distributed graph processing engine such as PGX.DIST.

An embodiment need not execute second software instructions 140. If executed, both software instructions 120 and 140 would produce the same particular result 160 when processing graph 150. Computer 110 need not ever access graph 150. Graph 150 need not exist during generate 115. Second software instructions 140 may be reused to process graphs other than graph 150.

Example Search Compilation Process

FIG. 2 illustrates example search compilation process 200 that automatically generates a multi-source breadth-first search from high-level graph language, according to an embodiment. For explanatory purposes, search compilation process 200 may be discussed with reference to FIG. 1. For example, computer 110 performs search compilation process 200.

In step 202, original instructions are analyzed. For example, first software instructions 120 are configured to perform similar breadth-first searches 121-123. Computer 110 analyzes first software instructions 120 to detect explicitly specified breadth-first searches 121-123. To accomplish this, computer 110 may load or stream first software instructions 120 from memory, disk, or over a network. Computer 110 may have a lexer, parser, or compiler that processes first software instructions 120 according to a grammar, syntax, or language specification of a high level graph processing language that first software instructions 120 conform to.

Computer 110 may construct an abstract syntax tree or other data structure that represents first software instructions 120 in a format amenable to analysis. Computer 110 may perform syntactic, semantic, or other static analysis of first software instructions 120, such as data- or control-flow analysis or recognition of structural or behavioral patterns. Semantic analysis may regard denotational semantics, axiomatic semantics, operational semantics, or abstract interpretation. Analysis of first software instructions 120 may involve constraint checking of bread-first searches 121-123 and surrounding statements to ensure applicability.

In step 204, generated instructions are derived from original instructions. For example, computer 110 combines breadth-first searches 121-123 into multi-source breadth-first search 130. Computer 110 generates second software instructions 140 based on the analysis of first software instructions 120. Second software instructions 140 are configured to perform multi-source breadth-first search 130. Second software instructions 140 may be configured to perform other multi-source breadth-first searches from other sets of breadth-first searches in first software instructions 120.

Second software instructions 140 may be expressed in a same language as first software instructions 120. Alternatively, second software instructions 140 may be expressed in a general purpose programing language such as C, C++, Python, Pig, Java, or a Java dialect such as Scala. Second software instructions 140 may be expressed in a binary format, such as Java bytecode or executable object code. Computer 110 may use a code generator, a compiler back-end, or a cross compiler to generate second software instructions 140. Second software instructions 140 may be configured for a particular distributed memory and processing paradigm including a cluster topology, such as Beowulf, MapReduce, PGX.D, or Apache Spark.

DSL Analysis

DSL analysis is discussed in context of search compiler system 100 from FIG. 1., although a DSL analysis may be performed with other search compiler implementations. Search compiler system 100 automatically generates a multi-source breadth-first search from explicitly specified breadth-first searches in iterations of a programmatic loop.

Computer 110 analyzes first software instructions 120 which may be specified in a DSL such as Green-Marl. In this example, first software instructions 120 is source code expressed in Green-Marl, a DSL for graph analysis and invented at Stanford University. Instead of Green-Marl source code, computer 110 may analyze programs written in another DSL or a general purpose programming language. Computer 110 may also analyze a structured binary format, such as Java bytecode.

During analysis, computer 110 scans first software instructions 120 for a pattern where the root node of a BFS is the iterator of the outer parallel loop, as shown below:

```
...
foreach(n: G.nodes) { // parallel iteration over nodes in graph G
    ... // outer logic
    inBFS(t: G.nodes from n) { // BFS starting from each vertex
        ... // inner logic
    }
    ...
}
```

In this example, the loop iterates over all vertices of graph G. In other examples, the loop may iterate over an arbitrary subset of vertices of a graph. Although the loop specifies iterations, computer 110 may recognize these iterations regardless of whether the iterations specify sequential or parallel execution. Alternatively, the "foreach" loop from the above code snippet may be specified as an iterative loop such as a for loop, a while loop, a repeat until loop, a do while loop, or other looping flow control idiom that specifies iteration.

Computer 110 scans first software instructions 120 for a control flow loop having a body of statements that includes an explicitly specified breadth-first search, such as the invocation of inBFS( ) in from the above example. If the proper pattern is detected, the search compiler system 100 proceeds to identifying batched variables and expressions, as discussed herein.

Detecting Batch Variables and Expressions

Once the DSL program is analyzed and it is determined that the MS-BFS technique is applicable, the DSL represented by the first software instructions 120 are transformed into a format that MS-BFS can be applied to. This procedure includes identifying variables that need to be batched—i.e. variables that are needed independently in every BFS instance and re-writing read/write access to the batched variables.

For example, because each BFS in the same MS-BFS batch cannot write to the same variable, each variable declaration needs to be detected and separately allocated for each BFS in the batch. Such variables are detected by going through all variable declarations in the outer loop context.

```
...
foreach(n: G.nodes) { // parallel iteration over nodes in graph G
    ... // outer loop context
    Int x;
    inBFS(t: G.nodes from n) { // BFS starting from n
        ... // inner loop context
        x = x + 1;
    }
}
```

For example, the above code snippet shows "Int x;" being defined in the outer loop context. Thus, the variable "x" becomes a batch variable in the generated code. That is, multiple instances of such a variable are held in a vector for the batch where the value of each instance is kept separately. Using the above code snippet as an example, the number of batches—i.e. outer loop iterations—defines the batch size.

The outer loop will iterate once for each node in graph G, and the thus, the number of nodes in graph G defines the batch size. So, if there was 6 nodes in graph G, the batch variable "x" gets transformed to a vector with 6 instances, assuming the batch-size is 6.

Read and Write Access to Variables

In MS-BFS, each BFS instance in a batch should behave as if the BFS instance is running in isolation. To realize this constraint, several things need to be considered.

For example, expressions that contain batch variables are considered batch expressions. Their value must be evaluated separately for every active batch execution as it may be different for each of them.

Additionally, assignments are dependent on whether batch or scalar values are read/written. In the case of assigning a batch variable or expression to a batch variable, a loop is created around the assignment that assigns every element from the assigning side to the assigned side. For example, for two batch variables a and b the assignment a=b becomes:

```
for (i in active_batch_executions)
    a_i = b_i ;
```

Note that such batch assignments are only valid when both sides refer to the same batch, i.e. the batch induced by the same loop around a BFS. This constraint is enforced by not allowing nested batch BFSs.

When assigning a scalar value to a batch variable, the given scalar value is assigned to all elements of the batch variable.

When assigning a batch variable or expression to a variable of a non-batch scalar type, simple value assignments are not allowed as this circumstance can lead to non-determinism. This is also the case for parallel assignments to a shared variable. Aggregations are permitted. For example, in the case of a sum assignment where all elements of a batch variable are added to a scalar variable, atomic increments may be used for synchronization.

Function Calls that are batch-aware, e.g. optimized internal function calls, are simply executed, as the batch property can be propagated in this case, i.e. if the batch is handled at a different position. Calls that are not batch-aware, e.g. external function invocation are run separately for every element in the batch variable.

Loops that are indexed on batch variables, e.g. count from 0 to the value of a batch variable, are executed separately for every batch element. This means a loop over all elements in the batch is created around each element.

BFS Transformation

After batchifying the variables, expressions, and statements, the BFS language construct is transformed into different high-level language code, i.e. a same-language transformation. The new code contains a loop over all nodes, referred to as 'Node Iteration Loop', and a loop over each node's neighbors, referred to as 'Neighbor Iteration Loop', among other statements. Specifically, the BFS construct and its surrounding foreach-loop are transformed into code that:

Declares a 'frontier' node property that keeps track in which level the node should be visited for each BFS source in the current batch. For example, if n.frontier[i]=z, then node n should be visited in level z for the [i]th BFS source in the current batch.

Initializes the frontier property before processing a batch. Specifically, before processing each batch, n.frontier[i] is set to 0 if n is the [i]th source in the current batch, and n.frontier[i]=∞ otherwise.

Visits active nodes, i.e. nodes that have n.frontier[i]=level for any 0≤i<B, and executes the body of the BFS for every i for which n.frontier[i]=level holds.

Propagates the frontier from active nodes s to their neighbors t1, . . . tn. The neighbor merges the received frontier with its own frontier according to the formula ti.frontier min=s.frontier+1.

Increments the current level and checks whether all BFSs in the current batch are finished. The current batch is finished if there does not exist a node n such that n.frontier[i]=level for any 0≤i <B. If the current batch is not finished, repeat from step 2. Otherwise, continue with the next batch until all batches are processed.

For example, the following high-level code fragment:

```
...
foreach (s : G.nodes) {
    inBFS (v : G.nodes from s) {
        (statements)
    }
    ...
}
``` is transformed into:

```
nodeProp<vector<int>[B]>frontier;
for (b in 0...batches-1) {
    // (not shown: initialise frontier for batch b)
    level = 0;
    while (!finished) {
        ...
        // Node Iteration Loop - Visit active nodes
        foreach (s : G.nodes) (any(i : 0..B) { s.frontier[i] == level }) {
            for (source : 0..B) {
                if (s.frontier[source] == level) {
                    (statements)
                }
            }
        }
        // Neighbor Iteration Loop - Propagate frontier from active
        nodes to neighbors
        foreach (s : G.nodes) (any(i : 0..B) { s.frontier[i] == level }) {
            foreach (t : s.nbrs) {
                t.frontier min= s.frontier + 1;
            }
        }
        level++;
        // (not shown: compute finished)
    }
}
```

Next, the search compiler system 100 matches the pattern of a foreach-loop iterating over all nodes, e.g. the node iteration loop shown in the above code snippet. The identified node iteration loop is transformed into an 'apply_to_vertices' operation, a primitive that is supported by the distributed graph processing engine. For example, the 'visit active node' loop in the previous code snippet is transformed into the following pseudocode:

```
apply_to_vertices (s => {
    for (source : 0..B) {
```

-continued

```
        if (s.frontier[source] == level) {
            (statements)
        }
    }
}}
```

Next, the search compiler system 100 matches the pattern of a foreach-loop iterating over all nodes and for each node iterating over its neighbors, e.g. neighbor iteration loop from the above first transformed code snippet. The identified neighbor iteration loop is transformed into a 'transfer_data' operation, a primitive that is 'c'. To this end, the compiler identifies which variables are read and written, i.e. message, in which direction the data moves, i.e. source/target, and over which edge the data moves, i.e. in-edge/out-edge.

For example, in the 'propagate frontier from active nodes' loop in the first transformed code snippet, the search compiler system 100 infers that frontier is read from 's' and written to T. As such, the frontier should be part of the message, 's' is the source of the data transfer, and T is the target of the data transfer. Since T is an out-neighbor of 's', data moves over the out-edges. Now the search compiler system 100 is able to transform the loop into the following pseudocode:

```
transfer_data {
    direction = OUT_EDGE,
    source_function = (s) => {
        return s.frontier
    },
    target_function = (t, message) => {
        t.frontier min= message.frontier + 1;
    }
};
```

The transformed neighbor iteration loop and node iteration loop are combined in a singular code segment to form target code, or second software instructions 140. During generation, computer 110 generates Java-or-C++ based on the analysis of the first software instructions 120. Java-or-C++ may be an implementation of second software instructions 140, although second software instructions 140 may have other implementations. Java-or-C++ may have source code of a general purpose programing language such as C, C++, Python, Pig, Java, or a Java dialect such as Scala.

The second software instructions 140 are supported by a distributed graph processing engine. In a distributed graph environment, different data points may be separately managed by different machines in a network of machines. Flow 200 provides a way to pass messages between different machines in a network of machines, performing operations using data that is locally stored or managed by the receiving machine, and transmitting computation results over the network via messages to other machines to generate final results.

For example, the second software instructions 140 include functionality where during a loop iteration, certain nodes are active and the active nodes send messages to their neighbor nodes, such that the neighbor nodes will become active in the next loop iteration. In a distributed graph, graph nodes may be stored on a plurality of machines in a network of machines. Sending a message from an active node to neighbor nodes may entail, for at least some of the neighbors, transmission over a network from a machine storing the active node to a machine storing the neighbor node. Thus, the integral step of passing messages between nodes in the above implementation requires communication and synchronization between machines that are part of the distributed machine network. The above techniques facilitate the automated generation of code that applies MS-BFS to BFS-based algorithms which run multiple independent BFS instances in a distributed system environment.

In contrast, a shared memory environment implements a different mechanism of applying MS-BFS to BFS-based algorithms which run multiple independent BFS instances. In these environments, MS-BFS code is not decomposed into loops over all nodes and there is no propagation of messages and synchronization between machines because all computation is performed in a single machine.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Software Overview

Figure 3:
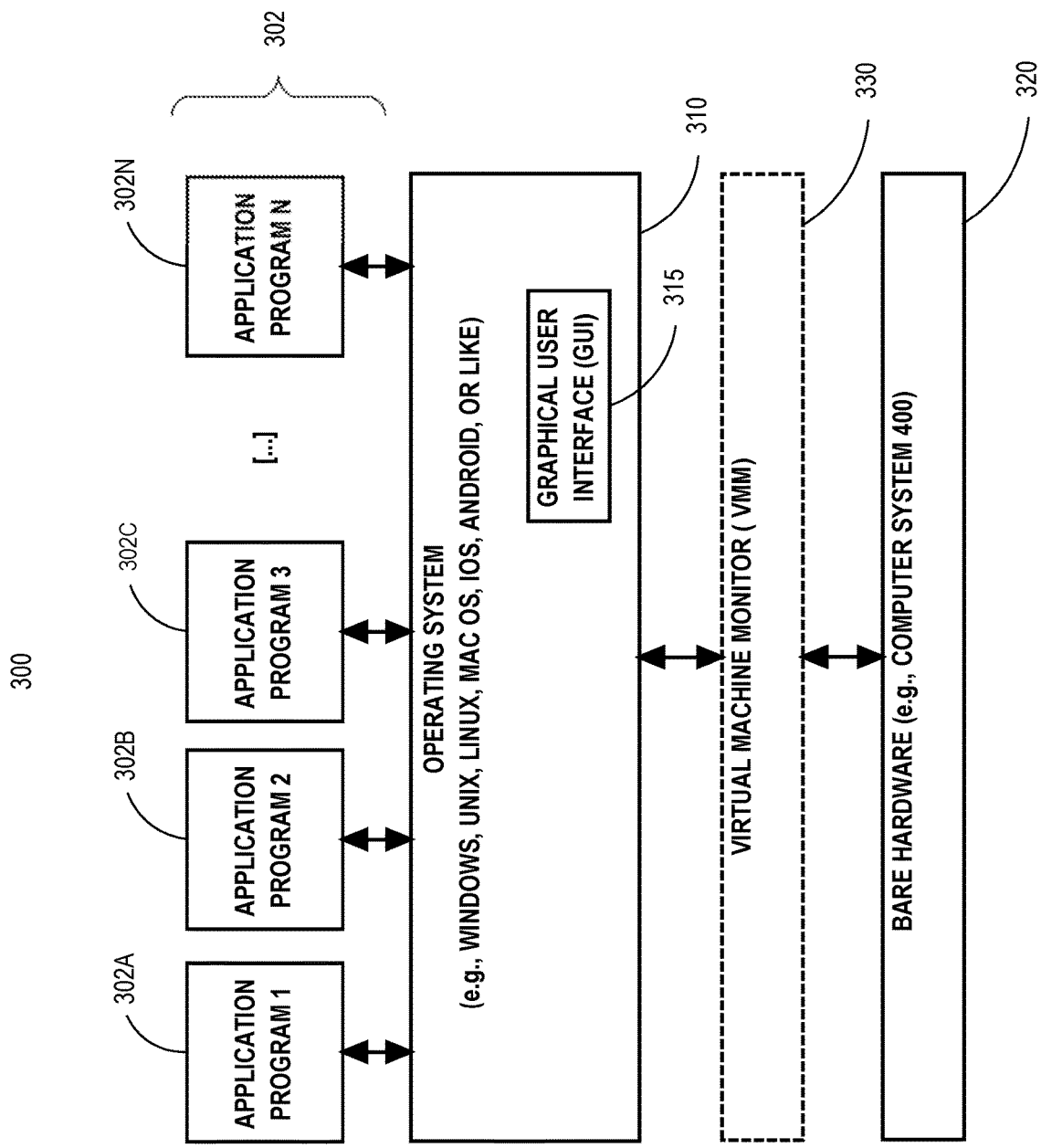
FIG. 3 is a diagram depicting a software system upon which an embodiment of the invention may be implemented.
Figure 4:
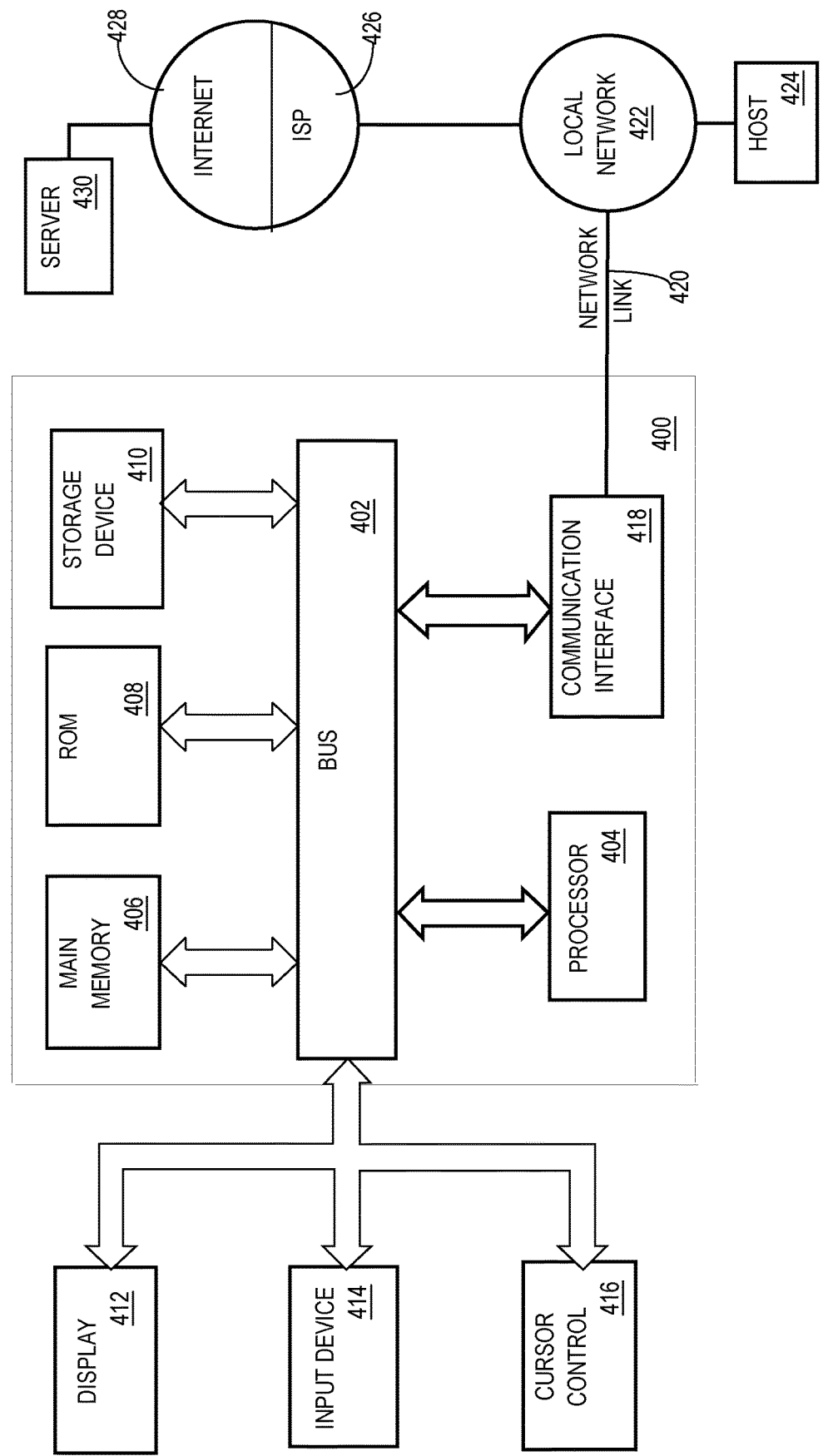
FIG. 4 is a diagram depicting a computer system that may be used in an embodiment of the present invention.

FIG. 3 is a block diagram of a basic software system 300 that may be employed for controlling the operation of computing system 400 of FIG. 4. Software system 300 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 300 is provided for directing the operation of computing system 400. Software system 300, which may be stored in system memory (RAM) 406 and on fixed storage (e.g., hard disk or flash memory) 410, includes a kernel or operating system (OS) 310.

The OS 310 manages low-level aspects of computer operation, including managing execution of processes, memory allocation, file input and output (I/O), and device I/O. One or more application programs, represented as 302A, 302B, 302C . . . 302N, may be "loaded" (e.g., transferred from fixed storage 410 into memory 406) for execution by the system 300. The applications or other software intended for use on computer system 400 may also be stored as a set of downloadable computer-executable instructions, for example, for downloading and installation from an Internet location (e.g., a Web server, an app store, or other online service).

Software system 300 includes a graphical user interface (GUI) 315, for receiving user commands and data in a graphical (e.g., "point-and-click" or "touch gesture") fashion. These inputs, in turn, may be acted upon by the system 300 in accordance with instructions from operating system 310 and/or application(s) 302. The GUI 315 also serves to display the results of operation from the OS 310 and application(s) 302, whereupon the user may supply additional inputs or terminate the session (e.g., log off).

OS 310 can execute directly on the bare hardware 320 (e.g., processor(s) 404) of computer system 400. Alternatively, a hypervisor or virtual machine monitor (VMM) 330 may be interposed between the bare hardware 320 and the OS 310. In this configuration, VMM 330 acts as a software "cushion" or virtualization layer between the OS 310 and the bare hardware 320 of the computer system 400.

VMM 330 instantiates and runs one or more virtual machine instances ("guest machines"). Each guest machine comprises a "guest" operating system, such as OS 310, and one or more applications, such as application(s) 302, designed to execute on the guest operating system. The VMM 330 presents the guest operating systems with a virtual operating platform and manages the execution of the guest operating systems.

In some instances, the VMM 330 may allow a guest operating system to run as if it is running on the bare hardware 320 of computer system 400 directly. In these instances, the same version of the guest operating system configured to execute on the bare hardware 320 directly may also execute on VMM 330 without modification or reconfiguration. In other words, VMM 330 may provide full hardware and CPU virtualization to a guest operating system in some instances.

In other instances, a guest operating system may be specially designed or configured to execute on VMM 330 for efficiency. In these instances, the guest operating system is "aware" that it executes on a virtual machine monitor. In other words, VMM 330 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Multiple threads may run within a process. Each thread also comprises an allotment of hardware processing time but share access to the memory allotted to the process. The memory is used to store content of processors between the allotments when the thread is not running. The term thread may also be used to refer to a computer system process in multiple threads are not running.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

analyzing a first plurality of software instructions, wherein the first plurality of software instructions is configured to perform a plurality of breadth-first searches to determine a particular result, wherein each breadth-first search of the plurality of breadth-first searches originates at each vertex of a plurality of vertices of a distributed graph, wherein each breadth-first search is encoded for independent execution;

based on said analyzing, generating a second plurality of software instructions configured to perform a multi-source breadth-first search to determine the particular result, wherein each vertex of the plurality of vertices is a source of the multi-source breadth-first search;

wherein the second plurality of software instructions comprises a node iteration loop and a neighbor iteration loop, wherein the plurality of vertices of the distributed graph comprises active vertices and neighbor vertices;

wherein the node iteration loop is configured to iterate once per each active vertex of the plurality of vertices of the distributed graph, wherein the node iteration loop is configured to determine the particular result;

wherein the neighbor iteration loop is configured to iterate once per each active vertex of the plurality of vertices of the distributed graph, wherein each iteration of the neighbor iteration loop is configured to activate one or more neighbor vertices of the plurality of vertices for a following iteration of the neighbor iteration loop.

2. The method of claim 1, wherein activating one or more neighbor vertices of the plurality of vertices for the following iteration of the neighbor iteration loop includes a first machine that stores a particular active vertex of the active vertices in local memory sending a message to a second machine that stores a particular neighbor vertex of the neighbor vertices in local memory.

3. The method of claim 2, wherein the message indicates that the particular neighbor vertex of the active vertices will be active for the following iteration of the neighbor iteration loop.

4. The method of claim 3, wherein the message is sent over a network.

5. The method of claim 1, wherein analyzing a first plurality of software instructions includes identifying batched variables and expressions, and re-writing read and write access to the batched variables and expressions.

6. The method of claim 1, wherein the second plurality of software instructions is configured to be executed by a distributed graph processing engine.

7. The method of claim 1, wherein the first plurality of software instructions comprises statements of a domain specific language (DSL).

8. The method of claim 7, wherein the DSL comprises Green-Marl.

9. The method of claim 1, wherein generating the second plurality of software instructions comprises generating at least one of: Java source code, Java bytecode, Python, or C++ source code.

10. The method of claim 1, wherein the first plurality of software instructions is configured to calculate at least one of: graph centrality, network flow, or all-pairs shortest paths.

11. A non-transitory computer-readable storage medium storing instructions that, when executed by one or more processors, cause the one or more processors to perform a method comprising:

analyzing a first plurality of software instructions, wherein the first plurality of software instructions is configured to perform a plurality of breadth-first searches to determine a particular result, wherein each breadth-first search of the plurality of breadth-first searches originates at each vertex of a plurality of vertices of a distributed graph, wherein each breadth-first search is encoded for independent execution;

based on said analyzing, generating a second plurality of software instructions configured to perform a multi-source breadth-first search to determine the particular result, wherein each vertex of the plurality of vertices is a source of the multi-source breadth-first search, wherein the second plurality of software instructions comprises a node iteration loop and a neighbor iteration loop, wherein the plurality of vertices of the distributed graph comprise active vertices and neighbor vertices;

wherein the node iteration loop is configured to iterate once per each active vertex of the plurality of vertices of the distributed graph, wherein the node iteration loop is configured to determine the particular result;

wherein the neighbor iteration loop is configured to iterate once per each active vertex of the plurality of vertices of the distributed graph, wherein each iteration of the neighbor iteration loop is configured to activate one or more neighbor vertices of the plurality of vertices for a following iteration of the neighbor iteration loop.

12. The non-transitory computer-readable storage medium of claim 11, wherein activating one or more neighbor vertices of the plurality of vertices for the following iteration of the neighbor iteration loop includes a first machine that stores a particular active vertex of the active vertices in local memory sending a message to a second machine that stores a particular neighbor vertex of the neighbor vertices in local memory.

13. The non-transitory computer-readable storage medium of claim 12, wherein the message indicates that the particular neighbor vertex of the active vertices will be active for the following iteration of the neighbor iteration loop.

14. The non-transitory computer-readable storage medium of claim 13, wherein the message is sent over a network.

15. The non-transitory computer-readable storage medium of claim 11, wherein analyzing a first plurality of software instructions includes identifying batched variables and expressions, and re-writing read and write access to the batched variables and expressions.

16. The non-transitory computer-readable storage medium of claim 11, wherein the second plurality of software instructions is configured to be executed by a distributed graph processing engine.

17. The non-transitory computer-readable storage medium of claim 11, wherein the first plurality of software instructions comprises statements of a domain specific language (DSL).

18. The non-transitory computer-readable storage medium of claim 17, wherein the DSL comprises Green-Marl.

19. The non-transitory computer-readable storage medium of claim 11, wherein generating the second plurality of software instructions comprises generating at least one of: Java source code, Java bytecode, Python, or C++ source code.

20. The non-transitory computer-readable storage medium of claim 11, wherein the first plurality of software instructions is configured to calculate at least one of: graph centrality, network flow, or all-pairs shortest paths.

* * * * *

UNITED STATES PATENT AND TRADEMARK OFFICE
CERTIFICATE OF CORRECTION

PATENT NO. : 10,795,672 B2  
APPLICATION NO. : 16/176853  
DATED : October 6, 2020  
INVENTOR(S) : Dwars et al.

Page 1 of 1

It is certified that error appears in the above-identified patent and that said Letters Patent is hereby corrected as shown below:

On the Title Page

On page 2, Column 2, Item (56) under Other Publications, Line 47, delete "Efficeient" and insert -- Efficient --, therefor.

On page 3, Column 1, Item (56) under Other Publications, Line 8, delete "Grpah" and insert -- Graph --, therefor.

On page 3, Column 1, Item (56) under Other Publications, Line 14, delete "Shorest" and insert -- Shortest --, therefor.

In the Claims

In Column 16, Line 11, in Claim 11, delete "search," and insert -- search; --, therefor.

Signed and Sealed this  
Twenty-fifth Day of May, 2021

Drew Hirshfeld  
*Performing the Functions and Duties of the*  
*Under Secretary of Commerce for Intellectual Property and*  
*Director of the United States Patent and Trademark Office*